United States Patent [19]
Kumar

[11] Patent Number: 5,768,493
[45] Date of Patent: Jun. 16, 1998

[54] ALGORITHM FOR FAULT TOLERANT ROUTING IN BENES NETWORKS

[75] Inventor: Manoj Kumar, Yorktown Heights, N.Y.

[73] Assignee: International Businees Machines Corporation, Armonk, N.Y.

[21] Appl. No.: 335,629

[22] Filed: Nov. 8, 1994

[51] Int. Cl.$^6$ ...................................................... G06F 11/34
[52] U.S. Cl. ............... 395/181; 395/182.01; 395/182.02; 370/216
[58] Field of Search ............................. 395/575, 182.02, 395/182.01, 181; 371/10.2, 8.2, 8.1, 7, 11.2; 379/2, 221, 273; 340/827; 370/60, 216

[56] References Cited

U.S. PATENT DOCUMENTS

| | | | |
|---|---|---|---|
| 5,179,551 | 1/1993 | Turner | 370/60 |
| 5,229,990 | 7/1993 | Teraslima | 370/60 |
| 5,327,550 | 7/1994 | Liew | 395/575 |
| 5,327,552 | 7/1994 | Liew | 395/182.02 |
| 5,331,631 | 7/1994 | Teraslima | 370/60 |
| 5,436,886 | 7/1995 | McGill | 370/16 |
| 5,471,460 | 11/1995 | Tanabe | 370/16 |

OTHER PUBLICATIONS

"THe GF11 Parallel Computer" J. Beetem et al. Experimental Computing Architectures. Elsevier Science Publishers BV. 1987 pp. 255–297.

"The GF-11 Supercomputer" J. Beetem et al. Proc. 12th Annual International Symposium on Computer Architecture Jun. 71–19, 1985 pp. 108–105).

Petzold, Charles, *Programming Windows™, The Microsoft Guide to writing applications for Windows* 3, 2d ed., Microsoft Press, Redmond, WA, 1990, pp. 605–631.

"Decomposition of Permutation Networks" H. R. Rananujam IEEE Trans. on Computers Vo. C–22, No. 7, Jul. 1973 pp. 639–943.

"A Permutation Network" A. Waksman Journal of Association for Computing Machinery vol. 15 #1 1/68 pp. 159–163.

*Primary Examiner*—Phung M. Chung

[57] ABSTRACT

Benes networks are used in SIMD single instruction multiple data parallel processing systems to provide interprocessor communication. The invention describes an algorithm which will allow these networks to be used in presence of several faults, without reducing their interconnection capability.

3 Claims, 4 Drawing Sheets

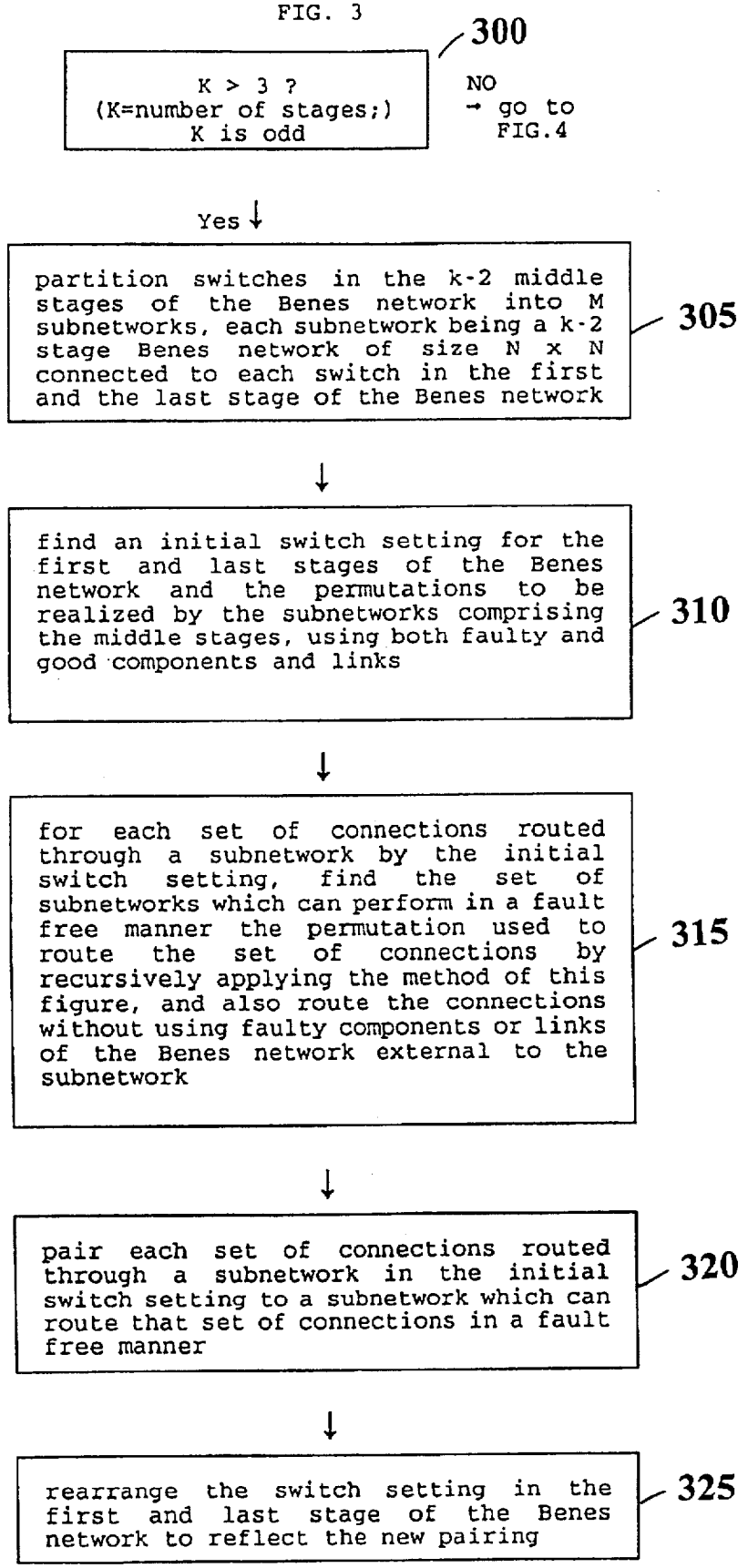

FIG. 4

- 400: K = 3 ? (K=number of stages;)
- 405: find an initial switch setting for the switches of the network using both good and faulty components and links
- 410: for each set of connections routed through a middle stage switch in the initial switch setting, find the set of middle stage switches which route these connections without using faulty components or links
- 415: pair each set of connections routed through a middle stage switch in the initial switch setting to a middle stage switch which can route that set of connections in a fault free manner
- 420: rearrange the switch setting in the first and last stage of the Benes network to reflect the new pairing

1

ALGORITHM FOR FAULT TOLERANT ROUTING IN BENES NETWORKS

FIELD OF THE INVENTION

Benes networks are used in SIMD parallel processing systems to provide interprocessor communication and in telecommunication networks as switches. The present invention is an algorithm which will allow these networks to be used in the presence of several faults, without reducing their interconnection capability.

BACKGROUND OF THE INVENTION

Benes networks can be used to provide connectivity among processors or between processors and memory modules in Single Instruction Multiple Data (SIMD) parallel computers. The most widely known example of such application is the IBM's GF11 parallel computer where 576 processors are connected together using a 576×576 Benes network. This network has three stages of 24×24 crossbar switches with 24 switches in each stage. Benes networks can realize arbitrary permutations (any one-to-one connection between their inputs and outputs). However, these networks are not self routing and the switch settings (permutation realized by the individual switches) for each switch in the network must be determined and loaded into the switch before the movement of the data can be initiated. Many algorithms are known for determining the switch settings of a Benes network to realize a given permutation, such as, for instance, the ones described in M. C. Paull, "Reswitching of Connection Networks," The Bell System Tech. Journal Vol. 41, May 1962, pp. 833–857; H. R. Ramanujam, "Decomposition of Permutation Networks," IEEE Trans. Comput. C-22(7), July 1973, pp. 639–643 and A. Waksman, "A Permutation Network," JACM 15(1), January 1978, pp. 159–163.

The switch settings in a Benes network that realize a given permutation are not unique. This observation, and the fact that most SIMD machines are designed with some spare processors, and consequently larger networks with extra input and output ports to connect these spare processors, can be used advantageously in accordance with the present invention to avoid faulty data paths in a Benes network.

SUMMARY OF THE INVENTION

The present invention is a method for assigning switch settings in a multistage Benes network having k stages, k being an odd number greater than 1, and having N switches of size M×M in the first and last stage of the Benes network, such that faulty connections and links are not used, comprising:

a) if k>3 then
1) partition switches in the k-2 middle stages of the Benes network into M subnetworks, each subnetwork being a k-2 stage Benes network of size N×N connected to each switch in the first and the last stage of the Benes network;
2) finding an initial switch setting for the first and last stages of the Benes network and the permutations to be realized by the subnetworks comprising the middle stages, using both faulty and good components and links;
3) for each set of connections routed through a subnetwork by the initial switch setting, finding the set of subnetworks which can perform in a fault free manner the permutation used to route the set of connections by recursively applying the method of this claim, and also route the connections without using faulty components or links of the Benes network external to the subnetwork;
4) pairing each set of connections routed through a subnetwork in the initial switch setting to a subnetwork which can route that set of connections in a fault free manner;
5) rearranging the switch setting in the first and last stage of the Benes network to reflect the new pairing;

b) if k=3 then
1) finding an initial switch setting for the switches of the network using both good and faulty components and links;
2) for each set of connections routed through a middle stage switch in the initial switch setting, finding the set of middle stage switches which route these connections without using faulty components or links;
3) pairing each set of connections routed through a middle stage switch in the initial switch setting to a middle stage switch which can route that set of connections in a fault free manner;
4) rearranging the switch setting in the first and last stage of the Benes network to reflect the new pairing.

FIGURES

FIGS. 2–4 are flow diagrams describing various embodiments of the method of the present invention.

DETAILED DESCRIPTION

Fault Model

Figure 1:
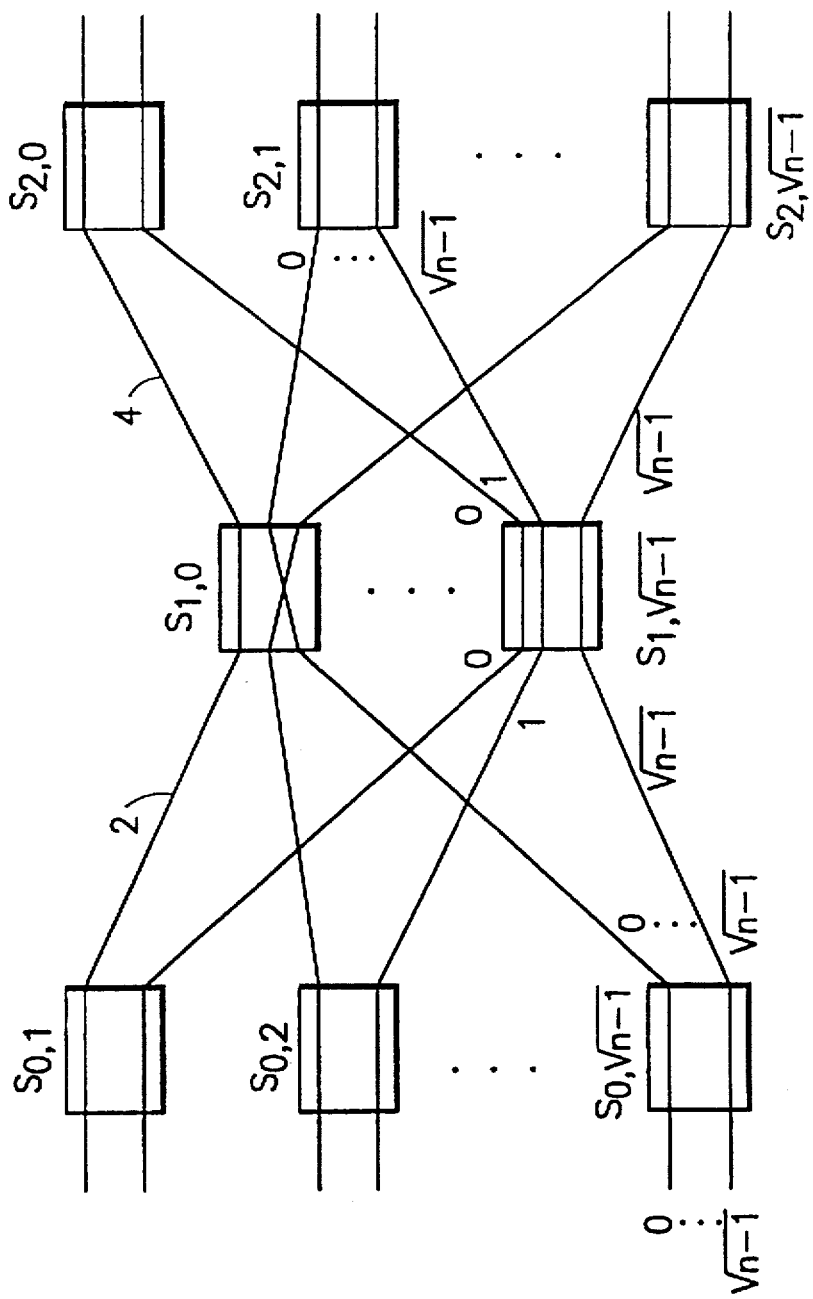
FIG. 1 is a three stage Benes network.

FIG. 1 is a three stage Benes network. While the following description is directed to a Benes network having three stages, it will be understood by those skilled in the art that the invention is applicable to Benes networks with more than three stages.

The network of FIG. 1 comprises a number $\sqrt{n}$ of first stage switches $S_{0,0} \ldots S_{0,\sqrt{n}-1}$ and a number $\sqrt{n}$ of third stage switches $S_{2,0} \ldots S_{2,\sqrt{n}-1}$. The Benes network of FIG. 1 is further characterized by having a number $\sqrt{n}$ of middle stage switches $S_{1,0} \ldots S_{1,\sqrt{n}-1}$. Each switch in the network of FIG. 1 has a number $\sqrt{n}$ of inputs and a number $\sqrt{n}$ of outputs. A plurality of links 2 connect outputs of first stage switches to inputs of middle stage switches, and a plurality of links 4 connect outputs of middle stage switches to inputs of third stage switches. In the network of FIG. 1, there are n links 2 and n links 4.

Two types of faults can occur in a three stage Benes network, like the one shown in FIG. 1. The first type of fault is the malfunctioning of a link 2 between either the first stage and the middle stage, or a link 4 between the middle stage and the third stage. In an n×n Benes network there are n links between consecutive stages, and any number of them can be faulty. The present invention does not deal with the failures of links entering the first stage of a network or of the links leaving the last stage because such failures force the loss of a processor and are considered as processor faults.

The second type of fault is the failure of an $\sqrt{n} \times \sqrt{n}$ switch to communicate from its input i to its output j, where $0 \leq i,j < \sqrt{n}$ (the inputs and outputs of switches in FIG. 1 are numbered from 0 to $\sqrt{n}-1$). Each switch has n such input-output pairs and any number of them can be faulty.

Failure of a link in a Benes network has the same effect on the connection capability of the network as $\sqrt{n}$ failures on either the switch driving the link or the switch receiving data from it. If the failing link is connected to the output 'O' of the switch driving it, then the link failure has the same effect as the failure of the switch to connect any of its inputs to output 'O'. Similarly, if the failing link is connected to Input I of the switch that receives data from it, then the link failure has the same effect as the failure of the receiving switch to connect its input I to any of its outputs.

A link failure will be represented herein as $\sqrt{n}$ failures in the switch that drives it. Thus, all the network faults can be represented as a set of forbidden input to output connections for each switch in the network.

Terminology

A typical three stage n×n Benes network, such as the one shown in FIG. 1, has 3 stages of $\sqrt{n} \times \sqrt{n}$ switches with $\sqrt{n}$ switches in each stage. These switches are denoted as $S_{i,j}$, and in a preferred embodiment, $0 \leq i < 3$ and $0 \leq j < \sqrt{n}$. The permutation to be performed by the Benes network will be denoted by $\pi$. Let $\sigma$ be a pattern of switch settings that make the network perform the permutation $\pi$. For a given permutation $\pi$, $\sigma$ is not unique.

Each switch in the Benes network is capable of performing any permutation between its $\sqrt{n}$ inputs and its $\sqrt{n}$ outputs. The switch settings of a Benes network refer to these permutations being performed by the switches. The permutation specified for switch $S_{i,j}$ by the switch setting $\sigma$ will be denoted as $P_{i,j}^{\sigma}$.

In the next section, a set (collection) of switch settings is considered, all of which settings make the Benes network perform a given permutation $\pi$. This set is denoted by $\Sigma$, its cardinality is denoted as $|\Sigma|$, and its members are represented as $\sigma[k]$ for $0 \leq k < |\Sigma|$. We use $\sigma[0]$ to denote an initial set of switch settings obtained by using one of the known algorithms, some of which are discussed in V. E. Benes, "Mathematical Theory of Connecting Networks and Telephone Traffic", Academic Press, NY, 1935; Paull, "Reswitching of Connection Networks," Bell Sys. Tech. J., vol. 41, May 1962, pp 833–857; Ramannajam, "Decomposition of Permutation Networks", IEEE Trans. Comput. C-22(7), July 1973, pp. 639–643; and Waksman, "A Permutation Network", JACM 15(1), January 1978, pp. 159–63. The set $\Sigma$ does not contain all the switch settings which make the network perform permutation $P_{i,j}^{\sigma}$. It is a much smaller subset which can be easily derived from $\sigma[0]$ as explained below.

Finding Fault Free Switch Settings

It is quite possible that the switch setting $\sigma[0]$, obtained by using one of the known algorithms, makes use of faulty input-output connections in some switches. This section discusses how a switch setting that does not use faulty input-connections in any switch can be derived from $\sigma[0]$.

First define $\Sigma$ by describing how all elements in it can be systematically derived from $\sigma[0]$. Enumerating all switch settings in $\Sigma$, and checking if any of them avoids faulty input-output connections in all switches is a formidable task. In accordance with the present invention, however, the well known Stable Marriage Algorithm from combinatorial analysis can be used to select a suitable element of $\Sigma$ without incurring the penalty of enumerating $\Sigma$. The next section defines the set $\Sigma$, the search space. The "Selection Algorithm" section describes the Stable Marriage Algorithm.

The Search Space

A network input I is connected to the first stage switch $S_{0,I \ div \ \sqrt{n}}$ and the network output O is connected to the last stage switch $S_{2,O \ div \ \sqrt{n}}$ (for integer x and y, x div y and x mod y denote the whole part and the remainder respectively of the result of the division of x by y). If the connection from network input I to output O goes through middle stage switch $S_{1,k}$, then the following must hold true for $$P_{0,I \ div \ \sqrt{n}}^{\sigma}, P_{(1,k)}^{\sigma} \text{ and } P_{2,O \ div \ \sqrt{n}}^{\sigma}: \quad (1)$$

$$P_{0,I \ div \ \sqrt{n}}^{\sigma}[I \ mod \ \sqrt{n}] = k$$

$$P_{1,k}^{\sigma}[I \ div \ \sqrt{n}] = O \ div \ \sqrt{n}$$

$$P_{2,O \ div \ \sqrt{n}}^{\sigma}[k] = O \ mod \ \sqrt{n}.$$

Given a switch setting $\sigma[0]$ for the Benes network, we can define $(\sqrt{n})!$ switch settings which make the network perform the same permutation as $\sigma[0]$. Consider the $(\sqrt{n})!$ permutations possible between the $\sqrt{n}$ inputs and $\sqrt{n}$ outputs of the switches used in the network. Let M denote an arbitrary permutation of this type and let M(j) denote the output to which the $j^{th}$ input is mapped by M. We can take all the input-output connections which go through middle stage switch k, $S_{1,k}$ (for $0 \leq k < \sqrt{n}$), in $\sigma[0]$ and route them through the middle stage switch $S_{1,M(k)}$. Let $\sigma[m]$ denote the new switch settings we derive from $\sigma[0]$ and M in this manner. Then the permutation specified for the switches by $\sigma[m]$ are given by the following equations:

$$P_{0,j}^{\sigma[m]} = M \otimes P_{0,j}^{\sigma[0]}$$

$$P_{1,j}^{\sigma[m]} = P_{1,M(j)}^{\sigma[0]} \quad (2)$$

$$P_{2,j}^{\sigma[m]} = P_{2,j}^{\sigma[0]} \otimes M^{-1}$$

In the above equations, the $\otimes$ symbol denotes the composition of two permutations, in the usual sense of function composition with the right permutation applied first. The first and the third equations show how the settings of the switches in the first and the third stages change so that all input-output connections which used a middle stage switch $S_{1,k}$ in $\sigma[0]$, now use the switch $S_{1,M(k)}$ in $\sigma[m]$. Thus the search space $\Sigma$ consists of the $(\sqrt{n})!$ distinct values of $\sigma[m]$ derived from the $(\sqrt{n})!$ distinct values possible for M.

Selection Algorithm

Let $\Pi_k$ denote the input-output connections that are routed through the middle stage switch $S_{1,k}$ in $\sigma[0]$. Now for each $\Pi_k$ we make a list $l_k$ of middle stage switches. A middle stage switch $S_{1,x}$ is in $l_k$ if no faulty switch connections are used by the network connections in $\Pi_k$ when they are routed through $S_{1,x}$.

By using Philip Hall's theorem (Hall, "Combinatorial Theory", Blaisdell Publishing Company, 1967) on distinct representatives, we can determine whether a $\sqrt{n} \rightarrow \sqrt{n}$ permutation M, and therefore a corresponding switch setting $\sigma[m]$ as defined in the preceding section, exists such that $\sigma[m]$ avoids the faulty connections in all switches. According to the theorem, at least one such permutation M exists if and only if:

For all values of k ($0 \leq k < \sqrt{n}$), and any choice of k element set $\{\Pi_{i_0}, \Pi_{i_1}, \ldots \Pi_{i_{k-1}}\}$, the union of the corresponding $l_i$ lists $(l_{i_0}, l_{i_1}, \ldots, l_{i_{k-1}})$ has at least k distinct middle stage switches in it.

The following algorithm can be used to determine whether a suitable value for M exists, and to find that value.

Recall that the permutation M is a pairing between $\sqrt{n}$ sets of connections $\Pi_i$, $0 \leq k < \sqrt{n}$ and $\sqrt{n}$ middle stage switches. We start with an empty list and invoke the following procedure repeatedly to add a new $\{\Pi_i, S_{1,j}\}$ pair to the list, until all $\Pi_i$s are paired off. The procedure follows:

Choose an unpaired $\Pi_i$ and label it as $\Pi_{i_0}$. If $l_{i_0}$ has an unpaired middle stage switch, then this switch can be paired with $\Pi_{i_0}$. Otherwise, pick an already paired middle stage switch from $l_{i_0}$, and denote it by $S_{1,i_1}$. Let $\Pi_{i_1}$ be the partner of $S_{1,i_1}$. (If M exists, then $l_{i_0}$ is not empty according to Hall's theorem with $k=1$.)

Now the combined lists of $\Pi_{i_0}$ and $\Pi_{i_1}$, i.e. $l_{i_0} \cup l_{i_1}$, contain at least one more middle stage switch $S_{1,i_2}$ (Hall's theorem with $k=2$). If $S_{1,i_2}$ is also paired, we find its partner $\Pi_{i_2}$ and search the list $l_{i_0} \cup l_{i_1} \cup l_{i_2}$ for a third middle stage switch $S_{1,i_3}$. If $S_{1,i_3}$ is also paired, we repeat the process of: 1) finding the partners of the paired $S_{1,i_j}$, 2) merging the $l_i$ lists of all such partners and $\Pi_{i_0}$, and 3) finding a new $S_{1,i_j}$ from this merged list, until we find an $S_{1,i_j}$ which is unpaired. Success is guaranteed at each step in this process due to Hall's theorem (if M exists), and the process must terminate because at least one $S_{1,i}$ is unpaired.

Each $S_{1,i_n}$ found in the preceding step appears on the list $l_{i_m}$ of at least one $\Pi_{i_m}$ with $m<n$. We choose an index $n$ with an initial value of $s$ where $S_{1,i_s}$ is the switch found in the last iteration of the previous step. $S_{1,i_n}$ is unpaired but on the list of $\Pi_{i_m}$, with $m<n$. We pair $S_{1,i_n}$ and $\Pi_{i_m}$, thereby leaving $S_{1,i_m}$ unpaired (if $m \neq 0$). If $m \neq 0$ then $n$ is set to $m$, and the step defined by the two preceding sentences is repeated until $m$ becomes 0. At this point we have added a new $\{\Pi_i, S_{1,j}\}$ pair to our list (by possibly changing the pairing pattern of the existing pairs).

Implementation

Appendix A is a Pascal program which implements the algorithm of this invention.

The Benes network used in this program is of size 576×576, comprising three stages of 24×24 switches with 24 switches in each stage.

The array permspec specifies the permutation to be performed by the network. Record i of the permspec array has two fields, the valid field indicating whether the input i is in use, and the opn field indicating the output of the network to which it connects.

The array switch specifies the switch setting or configuration for each switch in the Benes network, and the faults present in the switch. switch[i,j] is the $j^{th}$ switch of the $i^{th}$ stage. Three fields in switch[i,j], perm, inuse, and mux_fault, are arrays themselves, and the $k^{th}$ entry of each relates to the $k^{th}$ input of the switch. perm[k] specifies the switch output to which the $k^{th}$ switch input is connected when inuse[k] is true. mux_fault[k] specifies the set of outputs of the switch which can not be connected to input k because of the faults in the switch. Finally, link_faults specifies the set of switch outputs which can not be used because they are connected to faulty output links.

The main program starting at line 301 first calls the permute procedure to generate a permutation to be performed by the network. This procedure initializes the permspec array. Then procedure gen_err is called to generate a list of faults in the network. This routine initializes the mux_faults and link_fault variables in the switches. It also reflects the link_faults as mux_faults in the preceding switch. Then the procedure set_lswits is called to find the initial switch setting, $\sigma[0]$, also referred to as initial routing, for the switches of the Benes network to realize the permutation permspec. In determining the initial routing, link_faults and mux_faults are not avoided.

The procedure ls2ps_assign then pairs each set of connections going through a middle stage switch in the initial routing with a middle stage switch which can route the whole set of connections without using the faulty components of the network. To simplify the following discussion, we will refer to the set of connections routed through the middle stage switch i by the initial routing as connections of logical switch i, and the pairing of these connections with the middle stage switch j as assignment of logical switch i to physical switch j. The condition in line 321 of Appendix A checks for the successful completion of the above pairing for all logical switches, and if this pairing is successful, then the routine set_pswits rearranges the initial switch setting found by set_lswits to reflect the pairing determined by ls2ps_assign. The pairing defines the permutation m of the preceding section, and the set_pswits computes $\sigma[m]$ from M and $\sigma[0]$ using equation set 2.

The procedure ls2ps_assign computes the array ls2ps_mar. The value j in the $i^{th}$ entry of this array indicates that logical switch i is assigned to physical switch j. The procedure starts by building the array marriage_graph, the $i^{th}$ entry of which is the set of all physical switches through which the connections of logical switch i can be routed in a fault free manner. All entries in marriage_graph are first initialized to be the set of all middle stage switches (physical switches). Then for each connection i, $0 \leq i < 576$, we check to see if it can be routed through the physical switch j, $0 \leq j < 24$ in a fault free manner (lines 97–111). If connection i can not be routed through the physical switch j in a fault free manner, and it belongs to logical switch m, then j is deleted from marriage_graph[m] indicating that logical switch m can not be paired with physical switch j.

Once the marriage_graph has been computed, we pair each logical switch i to a physical switch j which is a member of marriage_graph[i] (lines 135–233 in Appendix A). This loop essentially implements the stable marriage algorithm.

Note that when pairing a logical switch i to some physical switch, the previously paired logical switches may have to be paired again with different physical switches.

To perform the above pairing, we maintain a list of physical switches which have not been paired to any logical switch. This list is maintained as the set avail_swits. We also maintain two lists chain[LS,.] and chain[PS,.]. When pairing logical switch i to a physical switch, we also maintain a list of candidate physical switches as the set know_set and a list of physical switches not to be used as the set avoid_set.

When finding a physical switch to be paired with a logical switch i, chain[LS,0] is initialized to i, know_set is initialized to marriage_graph[i], and avoid_set is initialized to be empty. In addition to i, chain[LS,.] grows to include the list of logical switches for which the logical switch to physical switch pairing must be reassigned in order to complete the pairing for i. For the already paired logical switch chain[LS,m], chain[PS,m] indicates the physical switch to which it was previously paired. know_set is the union of the marriage_graph entries of all the logical switches in chain[LS,.] and avoid_set is the set of all physical switches in chain[PS,.].

After initializing chain[LS,0], in lines 145–166 of the program we repeatedly add more logical switches to it until there is a physical switch in know_set which is also in the avail_set. Once this condition is reached the pairing can be performed in lines 195–219 of the program. The logical switch added to chain[LS..] is selected from the logical switches already paired to a physical switch in the know_set.

Once we find a physical switch in the above step which is in both the know_set and the avail_set, it is assigned to the logical switch chain[LS,k]. If k=0, then we have paired the logical switch i. Otherwise we have freed the physical switch chain[PS,k] to be paired with some logical switch chain[LS,l] for l<k. This step is repeated until logical switch i eventually gets paired with some physical switch.

Appendix B is a listing of all the pascal procedures needed to support the main program of Appendix A.

While the above discussion assumed that switches in all three stages were of identical size, it will be understood by those skilled in the art that the invention is applicable to three stage Benes networks in which the size of the middle stage switches is different than that of the first and third stage switches, as described in the summary of this invention. Similarly, for networks with more than three stages, switches in each pair of stages comprising two stages at the same distance from the middle stage can have a different size.

Figure 2:
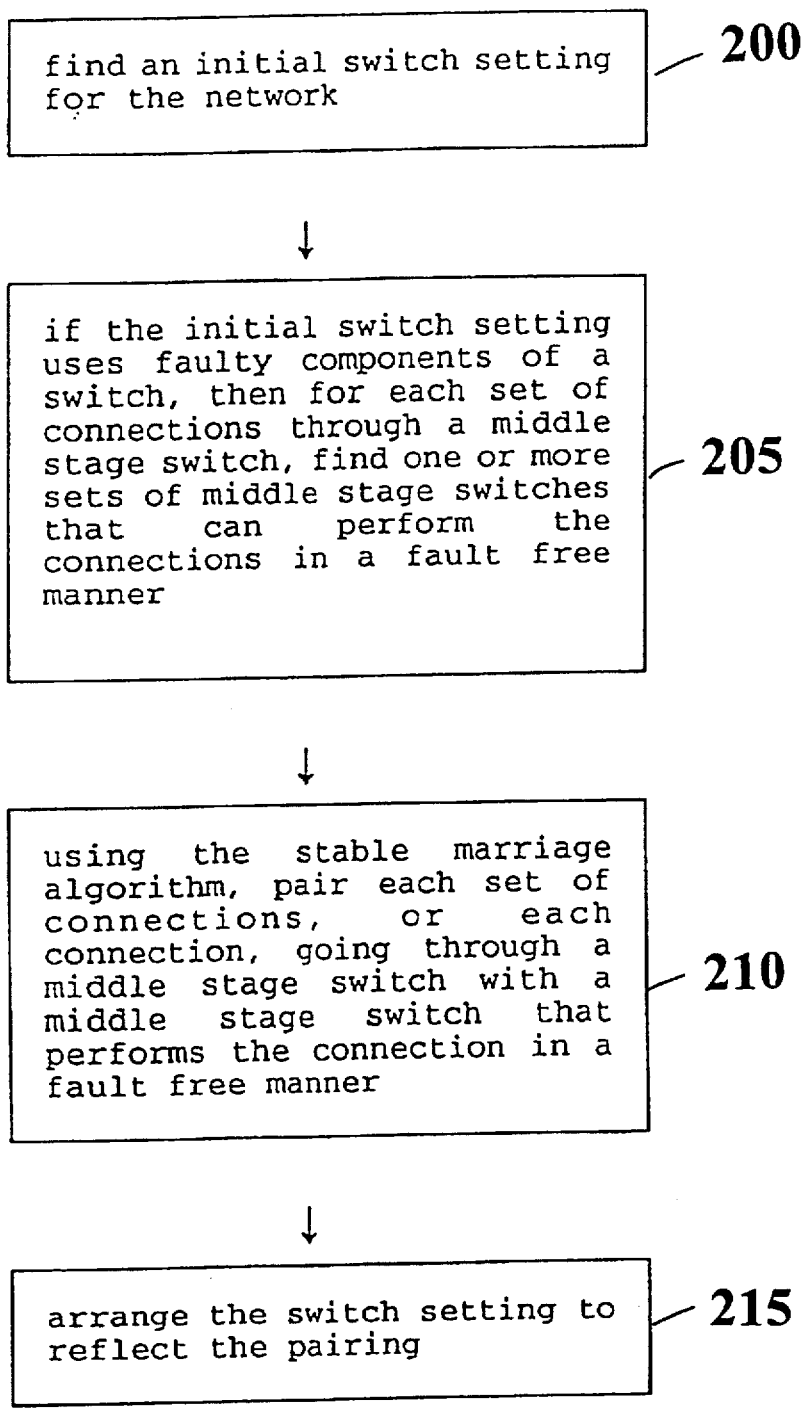

FIGS. 2–4 are flow diagrams describing various embodiments of the present invention.

APPENDIX A                                          Page 1

```
 1  /************************************************************/
 2  /*                                                          */
 3  /* Algorithm to find switch settings in a Benes network, such that */
 4  /* faulty paths can be avoided.  Uses M.C. Paull's algorithm to get */
 5  /* an initial logical configurations for the switches.  Then the   */
 6  /* configurations for the middle stage switches are assigned to the */
 7  /* physical switches of the network using stable-marriage algorithm. */
 8  /*                                                          */
 9  /************************************************************/
10
11  program tassl ;
12
13  type    SET24 = packed set of 0..23 ;
14
15  def err : text ;
16
17      permspec : array [0..575] of record
18                  opn : 0..575 ;   /* permspec[i] specifies the output */
19                  valid : boolean ;  /* to which input i is connected */
20              end ;
21
22      switch : array [0..2, 0..23] of record
23
24              /* Switch[i,j] is switch j in stage i. Perm is its   */
25              /* configuration, the permutation realized by it.    */
26
27                  perm  : array [0..23] of 0..23 ;
28                  inuse : array [0..23] of boolean ;
29
30              /* Fault Model. Mux_fault[i] is the set of outputs    */
31              /* that cannot be connected to input i. link_faults is*/
32              /* set of faulty output links connected to the switch */
33
34                  mux_fault : array [0..23] of SET24 ;
35                  link_fault : SET24 ;
36              end ;
37
38      ls2ps_mar, ps2ls_mar : array [0..23] of 0..23 ;
39      ls_unmar, avail_swits : SET24 ;
40
41  ref rand : integer ;
42
43      permmat : array [0..23, 0..23] of SET24 ;
44
45              /* Records the usage of middle stage switches by the */
46              /* first and third stage switches.  Permmat[]i,j] is */
47              /* a set of all 2nd stage switches making a connecti-*/
48              /* on from 1st stage switch i to last stage switch j */
49
50
51  var iter, success : integer ;
52
53
54  function random(var rand : integer ) : real ; external ;
55  procedure permute ; external ;
56  procedure gen_err ; external ;
57  procedure set_lswits ; external ;
```

APPENDIX A    Page 2

```
58  procedure prntswitset ; external ;
59  procedure prntmuxfail ; external ;
60  procedure prntlnkfail ; external ;
61
62
63  procedure ls2ps_assign ;
64
65  /***********************************************************/
66  /* Assigns the logical Middle stage switch configurations to the phy- */
67  /* sical middle stage switches, so that none of the active data paths */
68  /* use faulty hardware.  The output of this routine is the array     */
69  /* ls2ps_mar indicating the assignment, and the set ls_unmar of log. */
70  /* configurations which can not be assigned to a physical switch.    */
71  /***********************************************************/
72
73
74  var i, j, k, m, ii, kk : integer ;
75      fulset, know_set, avoid_set : SET24 ;
76      chain : array [(LS,PS),0..24] of -1..23 ;
77      marriage_graph : array [0..23] of SET24 ;
78
79  begin
80
81      fulset := [] ;
82      for i := 0 to 23 do
83          fulset := fulset + [i] ;
84
85      for i := 0 to 23 do              /* Initially a configuration */
86          marriage_graph [i] := fulset ;   /* can be assigned to any    */
87                                           /* physical switch           */
88
89
90
91      /*------------------------------------------------------------*/
92      /* Each input has a logical mss 'm' assigned to it. Try sending  */
93      /* it thru all physical mss and if it can not go thru pmss k then */
94      /* lmss can not be assigned to pmss k.                            */
95      /*------------------------------------------------------------*/
96
97      for i := 0 to 575 do
98          if permspec[i].valid then begin
99
100             k := permspec[i].opn ;
101             ii := i div 24 ;
102             kk := k div 24 ;
103             m := switch[0,ii].perm[i mod 24] ;
104
105             for j := 0 to 23 do
106
107                 if ( (j in switch[0,ii].mux_fault[i mod 24]) |
108                      (kk in switch[1,j].mux_fault[ii]) |
109                      ((k mod 24) in switch[2,kk].mux_fault[j]) ) then
110                         marriage_graph[m] := marriage_graph[m] - [j] ;
111         end ;
112
113
114     /* Print the Marriage Graph */
```

APPENDIX A   Page 3

```
115     /*-------------------------*/
116
117     writeln(err) ;          writeln(err) ;
118     writeln(err,' Marriage Graph For Logical And Physical Switches ') ;
119     writeln(err) ;
120     for i := 0 to 23 do begin
121        write (err, ' Node ', i:2, ':' ) ;
122        for j := 0 to 23 do
123           if ( j in marriage_graph[i] ) then
124              write (err, j:3 )
125           else
126              write (err, ' .' ) ;
127        writeln(err) ;
128     end ;
129
130
131     /**********************************/
132     /* Find the Stable marriage pattern */
133     /*-------------------------------*/
134
135
136     avail_swits := fulset ;
137     ls_unmar    := [] ;
138
139     for i := 0 to 23 do begin         /* i is the configuration index */
140
141        know_set := marriage_graph [i] ;
142        avoid_set := [] ;
143        m := 0 ;     chain[PS, 0] := -1 ;    chain[LS, 0] := i ;
144
145        while ( ((know_set * avail_swits) = []) &
146                (know_set <> avoid_set) ) do begin
147                     /* Catches know_set = [] or know_set = avoid set */
148
149           /* Chain[LS,m] can't be assigned to a free physical switch */
150           /*--------------------------------------------------------*/
151
152           j := 0 ;
153           while ( ¬ (j in (know_set - avoid_set))) do j := j + 1 ;
154           k := ps2ls_mar[j] ;
155           avoid_set := avoid_set + [j] ;
156
157           /* j is physical switch assigned to logical configuration k,*/
158           /* that can be assigned to chain[LS,m].  k and j are put on */
159           /* chain &  j is removed from further consideration.        */
160           /*----------------------------------------------------------*/
161
162           m := m + 1 ;
163           know_set := know_set + marriage_graph[k] ;
164           chain [PS, m] := j ;
165           chain [LS, m] := k ;
166        end ;
167
168        /* Print Chain */
169        /*-----------*/
170        if (m>0) then begin
171           writeln(err) ;
```

```
            writeln(err, ' LS to PS assignments rearranged') ;
            for k := 0 to m do
                writeln (err, ' k =' , k:3, ' C.LS ', chain[LS,k]:3,
                            ' C.PS ', chain[PS,k] ) ;
        end ;

if (know_set = avoid_set) then begin
            ls_unmar := ls_unmar + [i] ;

writeln (err) ;
            writeln (err, ' No Stable Marriage Pattern Exists ' ) ;
                      /*----------------------------------*/ writeln (err, ' The following', m:3, ' logical switches: ' ) ;
            for k := 0 to m do
                write (err, chain[LS,k]:3 ) ;        writeln (err) ;
            writeln (err, ' Can be mapped only to the following', (m-1):3,
                                        ' physical switches: ' ) ;
            for k := 1 to m do
                write (err, chain[PS,k]:3 ) ;        writeln (err) ;
        end else begin j := 0 ;
            while ( ¬ (j in (know_set * avail_swits))) do j := j + 1 ;
            avail_swits := avail_swits - [j] ;

/* j is an unassigned physical switch assignable to one of */
            /* the chained logical configuration                       */
            /*---------------------------------------------------------*/ repeat  begin
               k := 0 ;
               while (¬(j in marriage_graph [chain[LS, k]]) )
                    do k := k + 1 ;
                    /* chain[LS,k] is the lowest chained configuration */
                    /* assignable to j. Make the assignment.           */
                    /*-------------------------------------------------*/ ls2ps_mar[chain[LS,k]] := j ;
               ps2ls_mar[j] := chain[LS,k] ;

j := chain[PS, k] ;      /* newly freed physical switch */
               m := k ;                 /* chain becomes shorter       */
            end ; until ( m = 0 ) ;     /*-----------------------------*/
        end ;

writeln (err) ;
        writeln (err, ' Temporary Assignment ') ;
        for k := 0 to i do
            if (k in ls_unmar) then write (err, ' U' )
                        else write (err, ls2ps_mar[k]:3) ;
        writeln(err) ;
        for k := 0 to 23 do
            if (k in avail_swits ) then write (err, ' .')
```

```
                                         else write (err, ps2ls_mar[k]:3) ;
       writeln(err) ;

end ;
end ;

procedure set_pswits ;

/***********************************************************************/
/* Given the lgical switch configurations in 'switches', and their     */
/* assignment to physical switches in 'ls2ps_mar', the switch settings*/
/* for physical switches are computed and stored back in 'switches'.   */
/***********************************************************************/ var i, j, k : integer ;

/* temporary copy of physical switch settings to be put  */
             /*                                 put back in switches. */
    sw_col : array [0..23] of record
                perm  : array [0..23] of 0..23 ;
                inuse : array [0..23] of boolean ;
             end ;
begin /* Randomly map unassignable logical configurations to available    */
  /*                                              physical switches. */
  for i := 0 to 23 do
     if ( i in ls_unmar ) then begin
        j := 0 ;
        while ( ¬ (j in avail_swits)) do j := j + 1 ;
        ls2ps_mar[i] := j ;
        avail_swits := avail_swits - [j] ;
     end ;

for i := 0 to 2 do begin                            /* network stages */ for j := 0 to 23 do
        for k := 0 to 23 do
                  /* map logical mss j to physical mss ls2ps_mar[j] */
           case i of
           0: begin
                 sw_col[j].perm[k]  := ls2ps_mar [switch[i,j].perm[k]] ;
                 sw_col[j].inuse[k] := switch[i,j].inuse[k] ;
              end ;
           1: begin
                 sw_col[ ls2ps_mar[j] ].perm[k]  := switch[i,j].perm[k] ;
                 sw_col [ls2ps_mar[j]].inuse[k] := switch[i,j].inuse[k] ;
              end ;
           2: begin
                 sw_col[j].perm[ls2ps_mar[k]]  := switch[i,j].perm[k] ;
                 sw_col[j].inuse[ls2ps_mar[k]] := switch[i,j].inuse[k] ;
              end ;
           end ;

for j := 0 to 23 do
        for k := 0 to 23 do begin
```

APPENDIX A　　　Page 6

```
286            switch[i,j].perm[k]  := sw_col[j].perm[k] ;
287            switch[i,j].inuse[k] := sw_col[j].inuse[k] ;
288          end ;
289    end ;
290  end ;
291
292
293  /*******************************************************/
294  /*******************************************************/
295  /**                                                   **/
296  /**              THE MAIN PROGRAM                     **/
297  /**              ----------------                     **/
298  /*******************************************************/
299  /*******************************************************/
300
301  begin
302        rewrite(err, 'name =  tass1'  ||  '.listing.a' ) ;
303
304        /* Generate the problem */
305        /*----------------------*/
306
307        permute ;                /* Specify the permutation */
308        gen_err ;                /* specify the faults       */
309        prntmuxfail ;            /* print list of faults     */
310        prntlnkfail ;            /*  "    "   "    "         */
311
312
313        /* Solve the problem formulated above */
314        /*------------------------------------*/
315
316        set_lswits ;             /* determine log. switch settings  */
317        prntswitset ;
318
319        ls2ps_assign ;           /* Assign log. switches to physical */
320                                 /*      so that faults are avoided  */
321        if (ls_unmar <> [] ) then
322            writeln (err, ' LS to PS assignment NOT possible ' )
323        else begin
324            set_pswits ;
325            prntswitset ;
326        end ;
327
328        close (err) ;
329  end.
```

APPENDIX B                                          Page 1

```
/************************************************************/
/*                                                          */
/* Algorithm to find switch settings in a Benes network, such that */
/* faulty paths can be avoided. Uses M.C. Paull's algorithm to get */
/* an initial logical configurations for the switches. Then the   */
/* configurations for the middle stage switches are assigned to the */
/* physical switches of the network using stable-marriage algorithm. */
/*                                                          */
/************************************************************/ segment tass2 ;
const
    P_MUX_FAIL = 0.01 ;         P_LINK_FAIL = 0.0015 ;
    P_PROC_GOOD = 512 / 576 ;

type    SET24 = packed set of 0..23 ;

def rand : integer ;

permmat : array [0..23, 0..23] of SET24 ;

/* Records the usage of middle stage switches by the */
            /* first and third stage switches. Permmat[]i,j] is */
            /* a set of all 2nd stage switches making a connecti-*/
            /* on from 1st stage switch i to last stage switch j */ ref err : text ;

permspec : array [0..575] of record
                opn : 0..575 ;   /* permspec[i] specifies the output */
                valid : boolean ;  /* to which input i is connected */
            end ;

switch : array [0..2, 0..23] of record

/* Switch[i,j] is switch j in stage i. Perm is its   */
            /* configuration, the permutation realized by it.    */ perm  : array [0..23] of 0..23 ;
                inuse : array [0..23] of boolean ;

/* Fault Model. Mux_fault[i] is the set of outputs   */
            /* that cannot be connected to input i. link_faults is*/
            /* set of faulty output links connected to the switch */ mux_fault : array [0..23] of SET24 ;
                link_fault : SET24 ;
            end ;
value
    rand := 271828 ;

function random(var rand : integer ) : real ;

/************************************************************/
```

APPENDIX B  Page 2

```pascal
/* Plain old Random Number Generator.  Provides uniform distribution */
/* between 0 and 1.                                                  */
/*******************************************************************/
const
    multiplier = 314159269 ;       incrememt  = 453806245 ;
    mulhi = 314159269 div 32768 ;  mulow = 314159269 mod 32768 ;
    inchi = 453806245 div 32768 ;  inclo = 453806245 mod 32768 ;
var
    randlo, randhi : 0..131071 ;
    hi, lo, comhi : integer ;
begin
    randhi := rand div 32768 ;      randlo := rand mod 32768 ;
    randhi := (randhi mod 2) * 32768 + randhi ;
    hi := ((mulhi * randlo + mulow * randhi + inchi) mod 65536) * 32768;
    lo := mulow * randlo + inclo ;
    comhi := 2147483647 - hi ;
    if ( lo > comhi ) then
        rand := lo - comhi - 1
    else
        rand := lo + hi ;
    random := rand / 2147483647 ;
end ;

procedure permute ; external ;
procedure permute ;

/*******************************************************************/
/* Sets up an initial Permutation.  The output of this routine is the */
/* array permspec, specifying the permutation to be realized         */
/*******************************************************************/ var  i, si, holdindex : integer ;

begin
    for i := 0 to 575 do
        permspec[i].opn := i ;

for i := 575 downto 1 do begin
        si := trunc ( random(rand) * (i+1) ) ;
        holdindex    := permspec[si].opn ;
        permspec[si].opn := permspec[i].opn ;
        permspec[i].opn  := holdindex ;
        if ( random(rand) > P_PROC_GOOD ) then
            permspec[i].valid := FALSE
        else
            permspec[i].valid := TRUE ;
    end ;

writeln(err, ' Initial permutation ') ;
    for i := 0 to 575 do begin
        if ( (i mod 24) = 0 ) then
            writeln(err, ' ') ;
        if permspec[i].valid then
            write(err, permspec[i].opn:5 )
        else
            write (err, '  ...' ) ;
```

APPENDIX B                                Page 3

```
115        end ;
116        writeln(err, ' ') ;
117    end ;
118
119
120    procedure gen_err ; external ;
121    procedure gen_err ;
122
123    /****************************************************************/
124    /* Generates fault patterns for switch multiplexers and network links.*/
125    /* Sets the link_fault and muf_fault fields of switches.        */
126    /****************************************************************/
127
128    var i,j,k,m : integer ;
129
130    begin
131
132       for i := 0 to 2 do
133           for j := 0 to 23 do with switch[i,j]
134           do begin
135
136               link_fault := [] ;
137               for k := 0 to 23 do
138                   if ( random(rand) < P_LINK_FAIL ) then
139                       link_fault := link_fault + [k] ;
140
141               for k := 0 to 23 do begin
142
143                   mux_fault[k]  := [] ;
144
145                   for m := 0 to 23 do
146                       if ( (random(rand) < P_MUX_FAIL) |
147                                       (m in link_fault) ) then
148                           mux_fault[k] := mux_fault[k] + [m] ;
149               end ;
150           end ;
151    end ;
152
153
154    procedure formpermmat ;
155
156    /****************************************************************/
157    /* This is the CORE of M.C. Paull's algorithm.  Here the middle stage */
158    /* switch ''M' used by a permspec connection originating in first    */
159    /* stage switch 'i' and ending in last stage switch 'j' is added in  */
160    /* the set permmat[i,j].  Thus each permspec entry is assigned a mss. */
161    /****************************************************************/
162
163    var    i, j, k, mr, mc, A, B : integer ;
164           chain : array [(R,C),0..24] of -1..23 ;
165           fset, tset, rowset, colset : SET24 ;
166           a_ran_arr, b_ran_arr : array [0..23] of 0..23 ;
167           found : boolean ;
168
169    begin
170
171        for i := 0 to 23 do
```

APPENDIX B  Page 4

```
172        for j := 0 to 23 do
173            permmat[i,j] := [] ;
174
175     for k := 0 to 575 do
176     if permspec[k].valid then begin
177
178        mr := k div 24 ;                /* First & last stage switches */
179        mc := permspec[k].opn div 24 ;  /*    used by permspec[i]      */
180
181        fset := [] ;   rowset := [] ;   colset := [] ;
182        for i := 0 to 23 do begin
183            fset:= fset + [i] ;
184            rowset := rowset + permmat[mr,i] ;
185            colset := colset + permmat[i,mc] ;
186        end ;
187
188        tset:= fset - ( rowset + colset ) ;
189
190        if ( tset = [] ) then begin        /* Rearrangement Required */
191                                           /*------------------------*/
192
193                        /* Select 2 intermediate Stage Switches */
194                        /*--------------------------------------*/
195           for i := 0 to 23 do begin
196               a_ran_arr[i]:= i ;   b_ran_arr[i]:= i ;    end ;
197
198           for i := 23 downto 1 do begin
199               A := trunc ( random (rand) ) * (i+1) ;
200               B := trunc ( random (rand) ) * (i+1) ;
201  /**/        j := a_ran_arr[A] ;
202               a_ran_arr[A] := a_ran_arr[i] ;
203               a_ran_arr[i] := j ;
204               j := b_ran_arr[B] ;
205               b_ran_arr[B] := b_ran_arr[i] ;
206               b_ran_arr[i] := j ;
207  /**/        end ;
208
209           found := FALSE ;     i := 0 ;
210           while ( (i < 24) & (¬found) ) do
211               if ( (a_ran_arr[i] in colset) &
212                         (¬ (a_ran_arr[i] in rowset)) ) then begin
213                   found := TRUE ;
214                   A := a_ran_arr[i] ;
215               end
216               else
217                   i := i + 1 ;
218
219           found := FALSE ;     i := 0 ;
220           while ( (i < 24) & (¬found) ) do
221               if ( (b_ran_arr[i] in rowset) &
222                         (¬ (b_ran_arr[i] in colset)) ) then begin
223                   found := TRUE ;
224                   B := b_ran_arr[i] ;
225               end
226               else
227                   i := i + 1 ;
228
```

APPENDIX B                    Page 5

```
                                      /* Chain the Edges to be flipped */
                                      /*-----------------------------*/
229
230          for i := 0 to 24 do begin
231             chain[R,i] := -1 ;
232             chain[C,i] := -1 ;
233          end ;
234          chain[R,0] := mr ;
235          chain[C,0] := mc ;
236
237          found := TRUE ;      i := 0 ;
238          while found do begin
239
240             for j := 0 to 23 do
241                if ( A in permmat[j,chain[C,i]] ) then
242                   chain[R,i+1] := j ;
243
244             if (chain[R,i+1] = -1 ) then
245                found := FALSE
246             else
247                i := i + 1 ;
248
249             if found then begin
250                for j := 0 to 23 do
251                   if ( B in permmat[chain[R,i-1],j] ) then
252                      chain[C,i] := j ;
253
254                if (chain[C,i] = -1 ) then
255                   found := FALSE ;
256             end
257          end ;
258
259          repeat
260             if ( chain[C,i] <> -1 ) then begin    /* Convert B to A */
261                permmat [ chain[R,i-1], chain[C,i] ] :=
262                   permmat [ chain[R,i-1], chain[C,i] ] - [B] + [A] ;
263
264                i := i - 1 ;
265             end ;
266             if ( i > 0 ) then begin               /* Convert A to B */
267                permmat [ chain[R,i], chain[C,i-1] ] :=
268                   permmat [ chain[R,i], chain[C,i-1] ] + [B] - [A] ;
269                i := i - 1 ;
270             end ;
271          until ( i = 0 ) ;
272
273
274       end ;   /* Rearrangement Required */
275
276       tset := fset ;
277       for i := 0 to 23 do
278          tset := tset - ( permmat[mr,i] + permmat[i,mc] ) ;
279       i := 0 ;     found := FALSE ;
280       while ( (i < 24) & (¬found) ) do
281          if ( i in tset ) then begin
282             permmat[mr,mc] := permmat[mr,mc] + [i] ;
283             found := TRUE ;
284          end
285
```

```
              else
                  i := i + 1 ;
     end ;       /* for k loop */ end ;

procedure set_lswits ; external ;
procedure set_lswits ;

/**********************************************************************/
/* This routine computes the logical configurations using the permmat  */
/* entries generated by formpermmat                                    */
/**********************************************************************/ var i, j, k, inp, mr, mc : integer ;
    found : boolean ;
begin formpermmat ;                  /* Assign middle stage switches    */ for i := 0 to 2 do
       for j := 0 to 23 do
          for k:= 0 to 23 do
             switch[i,j].inuse[k] := FALSE ;

for inp := 0 to 575 do
       if permspec[inp].valid then begin
          mr := inp div 24 ;     mc := permspec[inp].opn div 24 ;
          found := FALSE ;       j := 0 ;
          repeat
             if ( j in permmat[mr,mc] ) then begin
                    found := TRUE ;
                    permmat[mr,mc] := permmat[mr,mc] - [j] ;

switch[0,mr].perm[inp mod 24] := j ;
                    switch[0,mr].inuse[inp mod 24] := TRUE ;

switch[1,j].perm[mr] := mc ;
                    switch[1,j].inuse[mr] := TRUE ;

switch[2,mc].perm[j] := permspec[inp].opn mod 24 ;
                    switch[2,mc].inuse[j] := TRUE ;

end
                else
                    j := j + 1 ;
          until found;
       end ;
end ;

procedure prntswitset ; external ;
procedure prntswitset ;

/**********************************************************************/
/* Print Configurations or physical switch settings.                   */
```

APPENDIX B        Page 7

```
343  /*******************************************************/
344
345  var i, j, k, l : integer ;
346  begin
347       writeln (err, '') ;          writeln (err, '') ;
348       writeln (err, ' The Switch Settings ') ;
349       for i := 0 to 23 do begin
350           writeln ( err, ' Row: ', i:-5 ) ;
351           for j := 0 to 2 do begin
352               write (err, ' ' ) ;
353               for k := 0 to 2 do begin
354                   for l := 0 to 7 do
355                       if switch[k,i].inuse[8*j+l] then
356                           write (err, switch[k,i].perm[8*j+l]:5 )
357                       else
358                           write (err, '  ...' ) ;
359                   if ( k <> 2 ) then
360                       write (err, '    ' ) ;
361               end ;
362               writeln (err, '' ) ;
363           end ;
364           writeln (err, '') ;
365       end ;
366  end ;
367
368
369  procedure prntmuxfail ; external ;
370  procedure prntmuxfail ;
371
372  /*******************************************************/
373  /* Print Mux  failure patterns in a pretty format.     */
374  /*******************************************************/
375
376  var i, j, k, l, m, n,   tint : integer ;
377      tstr : string(8) ;  tchar : char ;
378  begin
379       writeln (err, '') ;          writeln (err, '') ;
380       writeln (err, ' The Mux Failures ') ;
381       for i := 0 to 23 do begin
382           writeln ( err, ' Row: ', i:-5 ) ;
383           for j := 0 to 5 do begin
384               write (err, ' ' ) ;
385               for k := 0 to 2 do begin
386                   for l := 0 to 3 do
387                       with switch[k,i] do begin
388                           tstr := '' ;
389
390                           for m := 1 to 8 do begin
391                               tint := 0 ;
392                               for n:= 1 to 3 do
393                                   tint := 2 * tint +
394                                       ord ( (3*m-n) in mux_fault[4*j+l] ) ;
395                               if ( tint = 0 ) then
396                                   tchar := '.'
397                               else tchar := chr ( tint + ord('0') ) ;
398                               tstr := str (tchar) || tstr ;
399                           end ;
```

```
                                write (err, tstr:10) ;
                        end ;
                    if ( k <> 2 ) then
                        write (err, '        ' ) ;
                end ;
                writeln (err, '' ) ;
            end ;
            writeln (err, '') ;
        end ;
    end ;

procedure prntlnkfail ; external ;
    procedure prntlnkfail ;

/****************************************************************/
    /* Print Link failure patterns in a pretty format.            */
    /****************************************************************/ var i, j, k, l, m, n,   tint : integer ;
        tstr : string(8) ;  tchar : char ;
    begin
        writeln (err, '') ;         writeln (err, '') ;
        writeln (err, ' The Link Failures ') ;

for j := 0 to 5 do begin
            write (err, ' ' ) ;
            for k := 0 to 2 do begin
                for l := 0 to 3 do begin
                    tstr := '' ;

for m := 1 to 8 do begin
                        tint := 0 ;
                        for n:= 1 to 3 do
                            tint := 2 * tint + ord ( (3*m-n) in
                                    switch[k,4*j+l].link_fault ) ;
                        if ( tint = 0 ) then     tchar := '.'
                        else tchar := chr ( tint + ord('0') ) ;
                        tstr := str (tchar) || tstr ;
                    end ;

write (err, tstr:10) ;
                end ;
                if ( k <> 2 ) then
                    write (err, '       ' ) ;
            end ;
            writeln (err, '' ) ;
        end ;
        writeln (err, '') ;
    end ;
```

I claim:

1. A method for assigning switch settings in a Benes network, comprising the steps of:
   a) finding an initial switch setting for the Benes network;
   b) if the initial switch setting uses faulty components of a switch, then for each set of connections through a middle stage switch, determining a list of middle stage switches that are capable of performing the set of connections in a fault free manner;
   c) in accordance with the list found in step b, pairing each unpaired set of connections with a middle stage switch in the list determined for the set of the connections in step b, said step of pairing is performed using a Stable Marriage Algorithm; and
   d) arranging the switch setting to reflect the pairing of the set of connections and middle stage switches found in step c.

2. A method for assigning switch settings in a multistage Benes network having k stages, k being an odd number greater than 1, the k stages comprising k–2 middle stages, and the Benes network having N switches of size M×M in the first and last stage of the genes network, the method comprising the steps of:
   a) if k>3 then
      1) partitioning switches in the k–2 middle stages of the Benes network into M subnetworks, each subnetwork being a k–2 stage Benes network of size N×N connected to each switch in the first and the last stage of the Benes network;
      2) finding an initial switch setting for the first and last stages of the Benes network and one or more permutations to be realized by the subnetworks comprising the middle stages, using both faulty and good components and links;
      3) for each set of connections routed through a subnetwork by the initial switch setting, determining a list of subnetworks which can perform in a fault free non-blocking manner the permutation used to route the set of connections, and also to route the set of connections without using faulty components or links of the Benes network external to the subnetwork;
      4) forming a new pairing by pairing each unpaired set of connections with a subnetwork in the list determined for the set of connections in step 3; and
      5) rearranging the switch setting in the first and last stage of the Benes network to reflect the new pairing of the set of connections and subnetworks found in step 4; and
   b) if k=3 then
      1) finding an initial switch setting for the switches of the network using both good and faulty components and links;
      2) for each set of connections routed through a middle stage switch in the initial switch setting, determining a list of middle stage switches which route the set of connections without using faulty components or links in a fault free non-blocking manner;
      3) pairing each unpaired set of connections with a middle stage switch in the list determined for the set of the connections in step 2; and
      4) rearranging the switch setting in the first and last stage of the Benes network to reflect the new pairing of the set of connections and middle stage switches found in step 3.

3. The method of claim 2, wherein the pairing steps (a)(4) and (b)(3) are performed using a Stable Marriage Algorithm.

* * * * *